Figure 1:
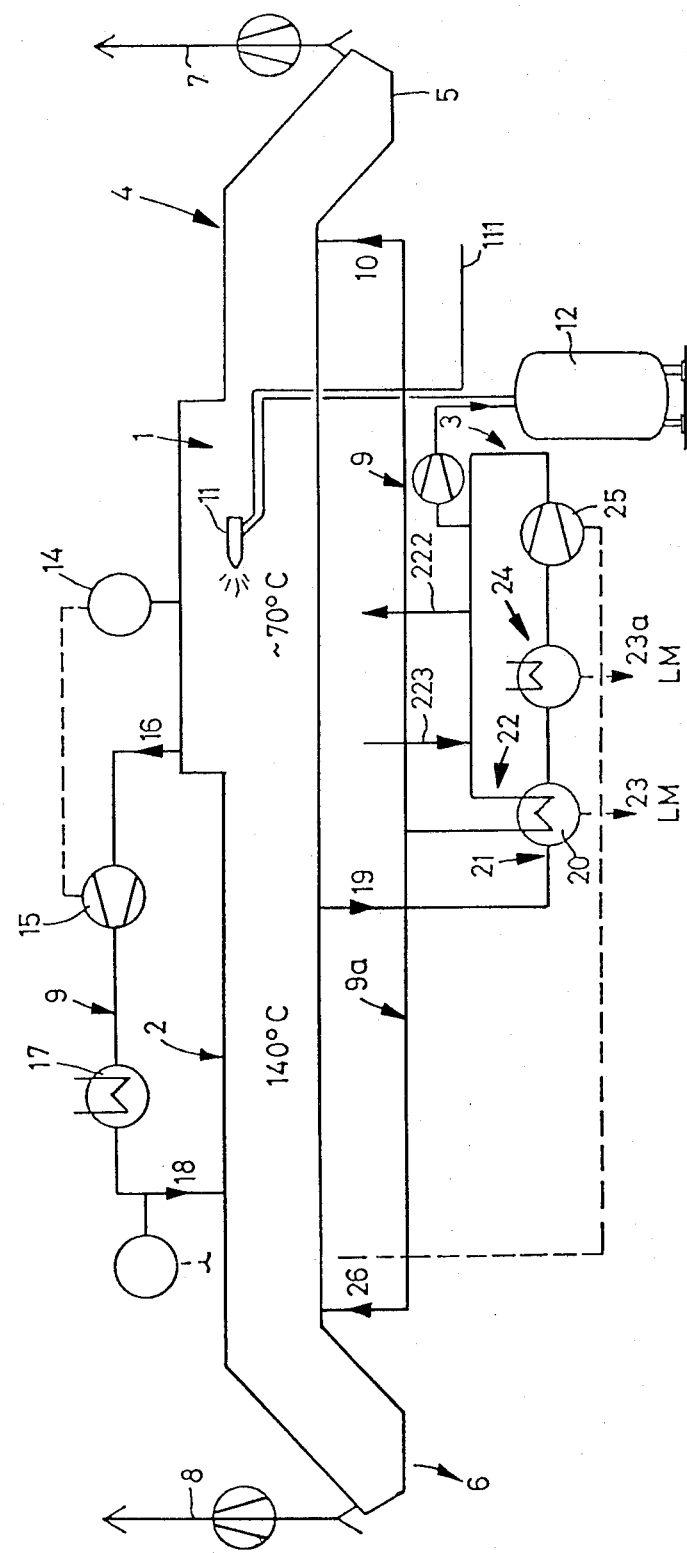

United States Patent [19]

Lauke

[11] 4,448,812

[45] May 15, 1984

[54] SPRAY COATING PROCESS, AND AN ARRANGEMENT FOR CARRYING OUT THE SAME

[75] Inventor: Arno Lauke, Münster, Fed. Rep. of Germany

[73] Assignee: BASF Farben & Fasern A.G., Hamburg, Fed. Rep. of Germany

[21] Appl. No.: 432,947

[22] PCT Filed: Feb. 11, 1982

[86] PCT No.: PCT/DE82/00027

§ 371 Date: Sep. 27, 1982

§ 102(e) Date: Sep. 27, 1982

[87] PCT Pub. No.: WO82/02843

PCT Pub. Date: Sep. 2, 1982

[30] Foreign Application Priority Data

Feb. 23, 1981 [DE] Fed. Rep. of Germany ....... 3106605

[51] Int. Cl.³ .............................................. B05D 1/02
[52] U.S. Cl. ..................... 427/377; 427/424; 98/115 SB; 118/663; 118/DIG. 7
[58] Field of Search ......................... 118/326, DIG. 7; 427/377, 924; 98/115 SB

[56] References Cited

U.S. PATENT DOCUMENTS

| | | | |
|---|---|---|---|
| 3,015,576 | 1/1962 | Hendrixson et al. | 118/326 X |
| 3,853,581 | 12/1974 | Fabre | 98/115 SB |
| 4,173,924 | 11/1979 | Bradshaw | 118/DIG. 7 |
| 4,257,783 | 3/1981 | Gutjahr | 55/61 |
| 4,266,504 | 5/1981 | Roesner | 118/326 X |
| 4,313,369 | 2/1982 | Tsuruta | 118/326 |
| 4,344,381 | 8/1982 | Ostrowski | 427/32 |

FOREIGN PATENT DOCUMENTS 2026683 2/1980 United Kingdom .

Primary Examiner—Shrive P. Beck
Attorney, Agent, or Firm—Wells & Wells

[57] ABSTRACT

The invention proposes a spray coating process in which through the use of inert gases the recovery of materials, safety at work and environmental protection conditions are improved, by drawing off, freeing from the solvents and returning to circulation the inert gases gaseously enriched (sic).

6 Claims, 2 Drawing Figures

SPRAY COATING PROCESS, AND AN ARRANGEMENT FOR CARRYING OUT THE SAME

The invention relates to a spray coating process using spray tools located in a closed spraying cabin, in which process the solvent-rich atmosphere is drawn off and, in considerable proportion, re-discharged into the spraying zone, and to an arrangement for carrying out such a process.

In coating individual components, such as, for example, automotive bodies, metal housings and the like, attempts are made, on the one hand, to increase further the quality of the coating film, while, on the other hand, efforts can be seen to lower the consumption of materials and energy. Raw material consumption is intended to be reduced, and, at the same time, the resulting emissions are intended to be reduced. To satisfy these different requirements, the particular coating processes and finish systems have been considerably further developed, and, for example, the two-component finishes, which are frequently used these days, satisfy the quality requirements and the energy-saving measures, but these finishes give rise to processing problems in respect of metering and safety at work aspects.

The proportion of returned air can be up to 100% when the spray guns are not operating. If the spray guns are in action, the proportion of returned air is lower. According to the prior art, for subdividing the exit air stream a mixing device comprising a deflection plate, an activator and a control system is provided. The prior art literature further states that the control device can be so adjusted that, in the work space, a maximum solvent concentration in the ambient air is not exceeded. In the known process, there is thus no recovery of the solvent, but more or less exit air from the spraying cabin is returned to the spraying cabin as a function of the solvent concentration.

The object of the invention is therefore to reduce the problems arising on using solvent-containing finishes and to propose a spray coating process in which, while the quality standard remains as high as before, the problems of metering, recovery of the materials, safety at work and environmental protection conditions are improved.

This object on which the invention is based starts from the consideration that it must be possible to maintain, in the actual spraying zone of a spray coating process, an inert gas atmosphere which, when enriched to a certain proportion by volume with solvents in the form of vapors, can be drawn off, the solvents then being removed from the inert gas atmosphere and the essentially solvent-free inert gas atmosphere being drawn off or returned into the cycle.

The inventive proposal is based on the consideration that when using an inert gas atmosphere not posing an explosive hazard the solvent fraction of the atmosphere can be considerably increased and that handling this mixture containing inert gas and solvent is possible without hazard, so that such a mixture can be processed in any conceivable treatment process without explosion protection measures and devices being necessary.

Solvents are added in coating technology as auxiliaries and they serve to improve atomization and to obtain certain properties of the wet finish film. When the finish has been applied, these solvents have fulfilled their task and are at present removed, while, according to the invention, it is now proposed that the solvents are concentrated, the fact that spraying zones will be fully automated in the future also supporting this consideration.

The most inexpensive inert gas available is fume gas, which is obtained on heating the spraying zone and generally the coating plant and to carry out the drying processes. In the dried and desulfurized state, it is alternately enriched with and stripped of solvent, so that continuous circulation of this inert gas is possible. In the spraying zone, the finish is applied at an elevated temperature which, in turn, is also possible since due to the ambient inert gas atmosphere such high temperatures are feasible without possible explosion hazards arising. At the same time, the higher temperature of the inert gas atmosphere effects an increased absorptive capacity for the solvents present in the form of vapors.

According to an essential feature of the invention, it is proposed that the spray coating zone is immediately followed by the drying zone, preferably in a closed continuous process, and that an inert gas atmosphere is also maintained in the drying zone.

It must also be considered an essential feature of the invention that the temperature of the inert gas atmosphere introduced from the spraying zone into the drying zone is further increased on transition from the spraying zone into the drying zone, preferably to twice the temperature value, so that the absorptive capacity of the inert gas atmosphere which is introduced into the drying zone is further increased.

The inert gas atmosphere in the drying zone is preferably passed countercurrent to the direction in which the components are transported in the drying zone.

In accordance with an essential feature of the invention, it is finally proposed that the inert gas atmosphere is passed in a closed circle, ie. a heat exchange zone is proposed in this circle, in which zone the fractions of solvent present in the inert gas atmosphere are separated out by cooling of the inert gas atmosphere, so that the absorptive capacity of the inert gas atmosphere is again restored. This can be achieved by providing, at the entry to the recovery zone, a countercurrent condenser, which is supplied, on the one hand, with the cold inert gas atmosphere, cooled down in a condenser, and, on the other hand, with the hot inert gas atmosphere coming from the drying zone, so that, in this countercurrent condenser, cooling down of the hot gases takes place and, at the same time, the cold inert gases freed from solvent are heated up again by the hot inert gases and can thus be returned in this prewarmed state to the circulation.

The use of an inert gas atmosphere in the spraying zone also has the effect that fractions of solids can also be removed in an explosion-proof way from the spraying zone. This is possible by using an entrainer or by means of filters for solids which are destroyed after use.

Figure 2:
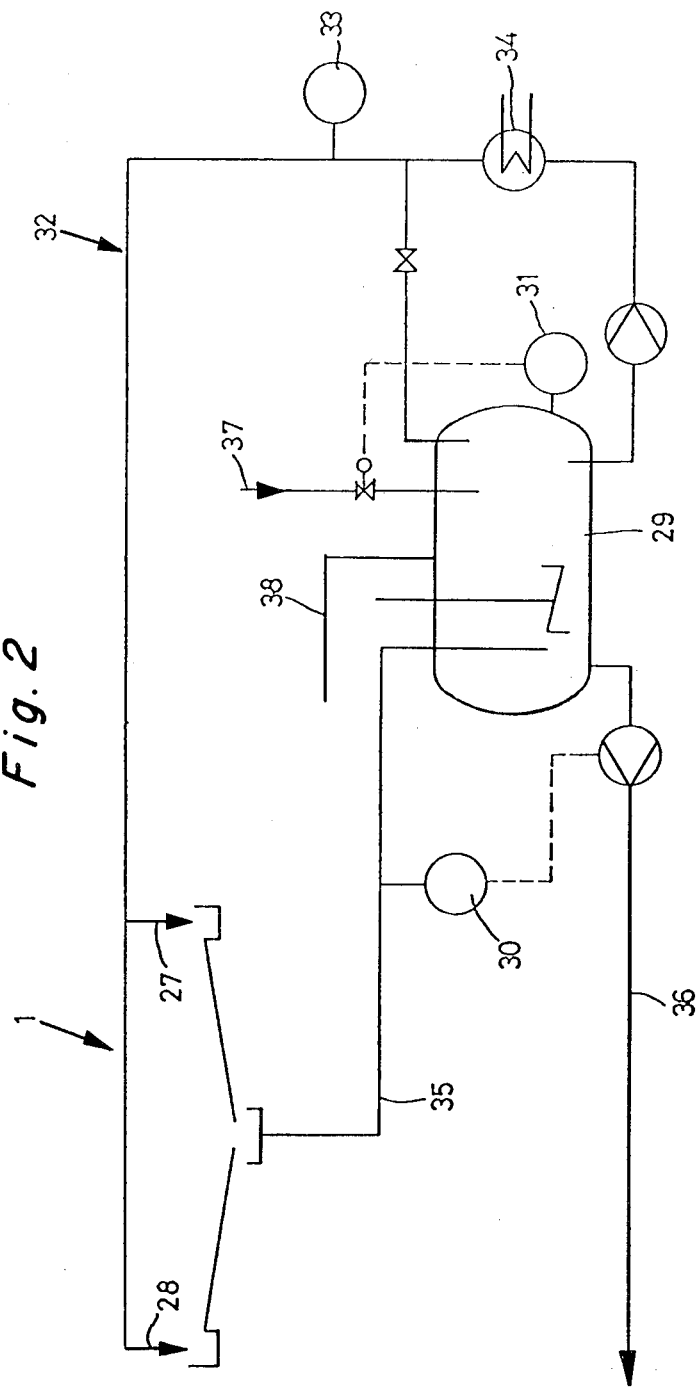

The process according to the invention is illustrated below by means of the schematic drawings. In these drawings FIG. 1 shows a schematic drawing of the process sequence according to the invention and FIG. 2 shows a schematic drawing of the removal of solids fractions.

In the schematic drawing, 1 identifies the spraying zone, 2 the drying zone and 3 the recovery zone. The spraying zone 1 and the drying zone 2 are located in a closed tunnel-shape plant 4 which, at its entry and exit 6, is sealed in each case by an exhaust, which exhausts are illustrated by the arrows 7 and 8.

A temperature of, for example, 70° C. prevails in the spraying zone 1, while in the drying zone 2 a temperature of 140° is maintained. The inert gas is passed along the solid lines identified in the drawing by 9. This inert gas is introduced at 10 into the plant 4 and passes from there to the actual spraying zone 1 in which the solvent-free inert gas atmosphere is suitable for taking up the solvents evolved during spraying by the spray tools shown schematically at 11. An inert gas buffer is shown at 12 and a finish supply line at 111.

An analytical control device 14 controls the off-take of the inert gas atmosphere in such a way that a certain degree of saturation of the inert gas atmosphere in the spraying zone is constantly maintained. These control impulses are passed from the analytical control device to a gas pump 15 which, at 16, withdraws the inert gases from the spraying zone 1, heats them up further in the preheater 17 located in the line 9 and passes them at 18 into the drying zone from which the gases are then withdrawn at 19, that is in countercurrent to the drying components. A quantity metering and controlling instrument can be located in the line 9 downstream of the preheater 17.

From the off-take point 19, the inert gases enriched with solvent, in particular by further heating to 140°, pass to the heat exchange zone 3 in which a countercurrent heat exchanger 20 is located which, on the one hand, is fed by the hot inert gases at 21 and which, on the other hand, is supplied at 22 with cooled inert gases which effect that, in the countercurrent heat exchanger, the hot inert gases introduced at 21 are cooled down, on the one hand, and separating out of the solvents is effected thereby, as illustrated by the arrow 23, the abbreviation "LM" identifying the solvents, and, on the other hand, the inert gases freed from solvents and passed via the line 9 away from the countercurrent heat exchanger are heated up.

The inert gas still containing solvent passes from the countercurrent heat exchanger 20 to a cooler 24 which cools down the inert gas atmosphere, for example to 5° C., so that, as illustrated by the arrow 23a, further solvents are separated out and the inert gas atmosphere is hence almost solvent-free. A feed pump 25 then feeds the solvent-free inert gas atmosphere via the entry 22 and the line 9 to the entry 10.

At the same time, a line 9a can be provided which branches off from the line 9 and enters close to the end of the drying zone into the plant 4, as illustrated by the arrow 26. This measure avoids the formation of a vacuum in this delivery region 6 of the plant 4 due to the escape of the hot inert gases at 19.

To keep the oxygen content in the inert gas/solvent mixture within limits, a certain amount of inert gas/solvent mixture is continuously exhausted via the exclusion line 222, and a corresponding amount of fresh inert gas is resupplied via the fresh inert gas supply line 223.

FIG. 2, also schematically, shows a section through the spraying zone 1, and it is intended to be illustrated here that solid particles of the finish are taken away by so-called entraining solvents supplied at 27 and 28. In the scheme shown, the mixture of solid particles and so-called entrainer is passed into a storage vessel 29, from which, controlled by an analytical control device 30, the entrainer saturated with solid particles can be drawn off. 31 designates a level controller for the tank contents, and it is possible to draw off continuously enriched entrainer, via an outlet line 36, and to feed in continuously, via the feed line 37, fresh entrainer and thereby to maintain the solids concentration in the line 32 at a constant value, it being possible for corresponding measuring control instruments 33 and preheater 34 to be included. Since in the tank 29 an inert gas atmosphere supplied via the line 38 likewise prevails, this plant can be handled without problems.

The $O_2$ content of the inert gas atmosphere is continuously monitored. The gas is recycled in such a way that the purified inert gas stream is passed into the outer zones, so that only solvent-free inert gas can leave under a low overpressure at the end of the plant 4.

When the process according to the invention is carried out normally, neither harmful emissions nor polluted effluents result. Solvents and solids can be recovered and, after appropriate treatment, reintroduced into the process. By coupling together the spraying zone and the drying zone, energy losses of the link through heat dissipation at the surface are only insignificantly higher than in the case of the single furnace. The main heat losses, which are produced by the transport of the actual components to be treated and the openings, remain unchanged compared to known processes. Energy savings over the normal process are therefore considerable. The proportion of heat losses in the spraying cabin, hitherto about 50%, would be eliminated in the process according to the invention.

The solvents and cleavage products can be worked up in a relatively simple manner, by filtration and rectification. When using several condensers, the solvents and cleavage products are obtained already separated by boiling ranges. As far as the solid particles are concerned, filtration, distillation and extraction steps are necessary.

I claim:

1. A spray coating process having a spraying zone (1), a drying zone (2) located after said spraying zone, a preheating zone located ahead of said spraying zone and a closed spraying cabin with spray tools mounted therein wherein an inert gas atmosphere is introduced into said preheating zone and a solvent enriched inert gas atmosphere is generated in said spraying and drying zones, solvents are removed from said solvent enriched inert gas atmosphere and said inert gas atmosphere free of solvents is recirculated to said drying zone.

2. The spray coating process of claim 1, wherein said solvent enriched inert gas atmosphere leaving said spraying zone receives an increase in temperature when it enters said drying zone (2) and said solvent-enriched inert gas atmosphere evacuated at the end of the drying zone (2) is rid of solvents in a heat exchange zone (3) by means of cooling.

3. The spray coating process of claim 2, wherein said solvent enriched inert gas atmosphere in said heat exchange zone (3) is introduced into a counter-flow heat exchanger (20) which is fed on the one hand with a hot inert gas atmosphere coming from said drying zone and, on the other hand, with a cooled atmosphere of inert gases from which the solvents have been removed.

4. The coating process of claim 1, wherein said inert gas atmosphere in said spraying zone (1) has a temperature of 70° C. and said inert gas atmosphere in said drying zone (2) has a temperature of 140° C.

5. The spray coating process of claim 2, wherein said inert gas atmosphere in said spraying zone (1) has a temperature of 70° C. and said inert gas atmosphere in said drying zone (2) has a temperature of 140° C.

6. In an apparatus for carrying out a spray coating process having a spraying zone (1), a drying zone (2), and a closed spraying cabin with spray tools mounted therein, means for maintaining an inert gas atmosphere in said spraying zone and said drying zone, means for removing said inert gas atmosphere, means for removing solvents from said inert gas atmosphere and means for feeding back said inert gas atmosphere free of solvents into said spraying zone (1) and said drying zone (2), means for analytically regulating said inert gas atmosphere being circulated and at least one heat exchanger, the improvement comprising said means for analytically regulating (14) mounted in said spray zone (1) and automatically controlling a blower (15) when a predetermined saturation level of said inert gas atmosphere by solvents is exceeded, for the purpose of moving said inert gas atmosphere out of said spray zone (1) into said drying zone (2), and in that a counter-flow heat exchanger (20) for solvent-enriched inert gas atmosphere at higher temperature evacuated from said drying zone (2) is mounted in a heat exchange zone (3) which also contains a fluid cooler (24) with said inert gas atmosphere issuing from said fluid cooler and rid of its solvent portion by the cooling process being fed as a counterflow medium to said counterflow heat exchanger (20).

* * * * *